UNITED STATES PATENT OFFICE.

ANGELO MYERS, OF PHILADELPHIA, PENNSYLVANIA.

PROCESS OF MANUFACTURING FERMENTED AND DISTILLED LIQUORS.

SPECIFICATION forming part of Letters Patent No. 553,998, dated February 4, 1896.

Application filed July 25, 1895. Serial No. 557,147. (No specimens.)

*To all whom it may concern:*

Be it known that I, ANGELO MYERS, a citizen of the United States, residing in the city and county of Philadelphia, in the State of Pennsylvania, have invented certain new and useful Improvements in Processes of Manufacturing Fermented and Distilled Liquors, of which the following is a specification.

In the manufacture of fermented and distilled liquors, as is well known, a quantity of grain, selected according to the ultimate product desired, is, to form the mash, ground or crushed and cooked at a temperature and for a period well known to those familiar with the art, and not necessary to be detailed herein. The next step of the manufacture is to convert the starch contained in the mash into fermentable sugar, and it is customary to accomplish this by the addition to the mash of a quantity of malt, which, as is well known, contains an element or principle adapted for the purpose and known as "diastase."

The process of preparing the malt used in the treatment of the mash is, apart from the objection that the power of the malt to convert starch to sugar is impaired by its subjection to the usual kiln-drying, very expensive, because involving the use of costly machinery and special malting-houses, the employment of skilled labor in the selection and assortment of the materials and the constant supervision of the process of sprouting, and somewhat uncertain in result because of the liability of the mass to grow too much or to develop a growth of mold.

Generally stated, it is the object of my invention to simplify and cheapen the production and cost of fermented and distilled liquors by dispensing with the use of the malt and substituting in lieu thereof a new process of supplying to the mass the elements existing in grain which act upon the mash to convert the starch into sugar.

That part of the grain present in the malt which acts to transform the starch of the mass of mash into sugar is in the art termed "diastase," and I have discovered that this element exists in that portion of the grain which is termed the "hull" or "coat," as distinguished from the husk or chaff on the one hand and the kernel or starchy part on the other, and does not exist in appreciable quantities in said kernel or chaff, and, further, that this hull, which, when separated from the remainder of the grain by ordinary milling processes, is commercially known as "bran," does not in this separation lose any of its power of converting the starch; but, on the contrary, the bran taken from a quantity of grain will contain practically all the diastase originally present in the said grain.

In the practice of my process I take a selected quantity of bran from any desired cereal and place it, together with sufficient water, in a suitable containing-vessel, and allow the mass, which is to be maintained artificially or otherwise at a temperature conveniently, but not restrictively, between 60° and 90° Fahrenheit, but preferably at 75°, to stand for from eighteen to thirty-six hours. When the mass has stood for this period of time, nearly all of the starch-converting elements in the bran will be dissolved and held in solution in the water.

The mash-tub having been supplied with mash cooked to the required degree and brought to the same temperature at which it is held when malt is added to it in the ordinary process, I proceed by adding to the mash the water in which the bran has been steeped, together preferably with the bran, and thereupon proceed with the development of the mash in all other respects in the usual manner.

I prefer to add the "bran solution," as I term it, to the mash when the latter has been brought to a temperature of about 155° Fahrenheit; but it is of course practicable to add the solution to the mash when the latter is at any temperature between 120° and 160° Fahrenheit, and possible to add the solution to the mash with valuable result when the latter is at any temperature between the extremes of 110° and 170° Fahrenheit.

The amount or proportion of the bran solution added to the mash will vary somewhat, according to the character of the bran employed, of the mash, and of the ultimate product desired.

I prefer in the soaking or steeping of the bran to employ from one-half to five-eighths of a gallon of water to the pound of bran, and in preparing the bran solution to be added to the mash I prefer to use from six to twelve pounds of bran for each mash-bushel of mash.

As will be understood, in my improved process the diastase when used will be at the fullness of its strength and not deteriorated by the heat of the kiln-drying resorted to in the process of making malt. The bran solution, moreover, will, the bran not being exposed to air, be pure and free from the growths of mold to which ordinary malt is liable.

My improved process may be conducted by the ordinary operatives of a brewery as distinguished from expert maltsters and with no machinery except the steeping-vats. It may, moreover, be carried on at any time of year, whereas the manufacture of malt can be conducted for only some eight months of the year. Thus the necessity for places of storage is obviated. In my improved process the bran of any cereal used for any purpose that makes it necessary to take the bran off may be utilized, as opposed to the process of making malt, in which it is almost impracticable to use any cereal except barley. In my improved process, finally, the wasting of the diastase, which is in the ordinary malting process necessarily consequent upon the removal and discarding of the water in which the grain is steeped, is avoided.

I am aware that it has been proposed to form a thick paste of bran of wheat and water in a warm room at 85° to 95° Fahrenheit and keep it in a closed vessel for from twenty-four to thirty hours to form a fermenting agent or improved yeast to be added to a mash, and to such process, relating as it does exclusively to the formation of a yeast, I lay no claim.

Having thus described my invention, I claim—

1. In the manufacture of fermented and distilled liquors, the process of converting the starch contained in the mash into sugar, which consists in supplying to said mash, when said mash is at a temperature of from 110° to 170° Fahrenheit, liquid in which bran has been steeped, substantially as specified.

2. In the manufacture of fermented and distilled liquors, the process of converting the starch contained in the mash into sugar, which consists in supplying to said mash, when said mash is at a temperature of from 110° to 170° Fahrenheit, water and bran which have been standing commingled for from eighteen to thirty-six hours at a suitable temperature substantially as indicated, as specified.

3. In the manufacture of fermented and distilled liquors, the process of converting the starch contained in the mash into sugar, which consists in supplying to said mash, when said mash is at a temperature of from 110° to 170° Fahrenheit, a solution of bran, in the proportion of six to twelve pounds of bran in the solution to the mash-bushel, substantially as specified.

In testimony that I claim the foregoing as my invention I have hereunto signed my name this 16th day of July, A. D. 1895.

ANGELO MYERS.

In presence of—
J. BONSALL TAYLOR,
F. NORMAN DIXON.